March 10, 1931.   E. L. FICKETT   1,796,092
GEAR CUTTING MACHINE
Filed March 1, 1929
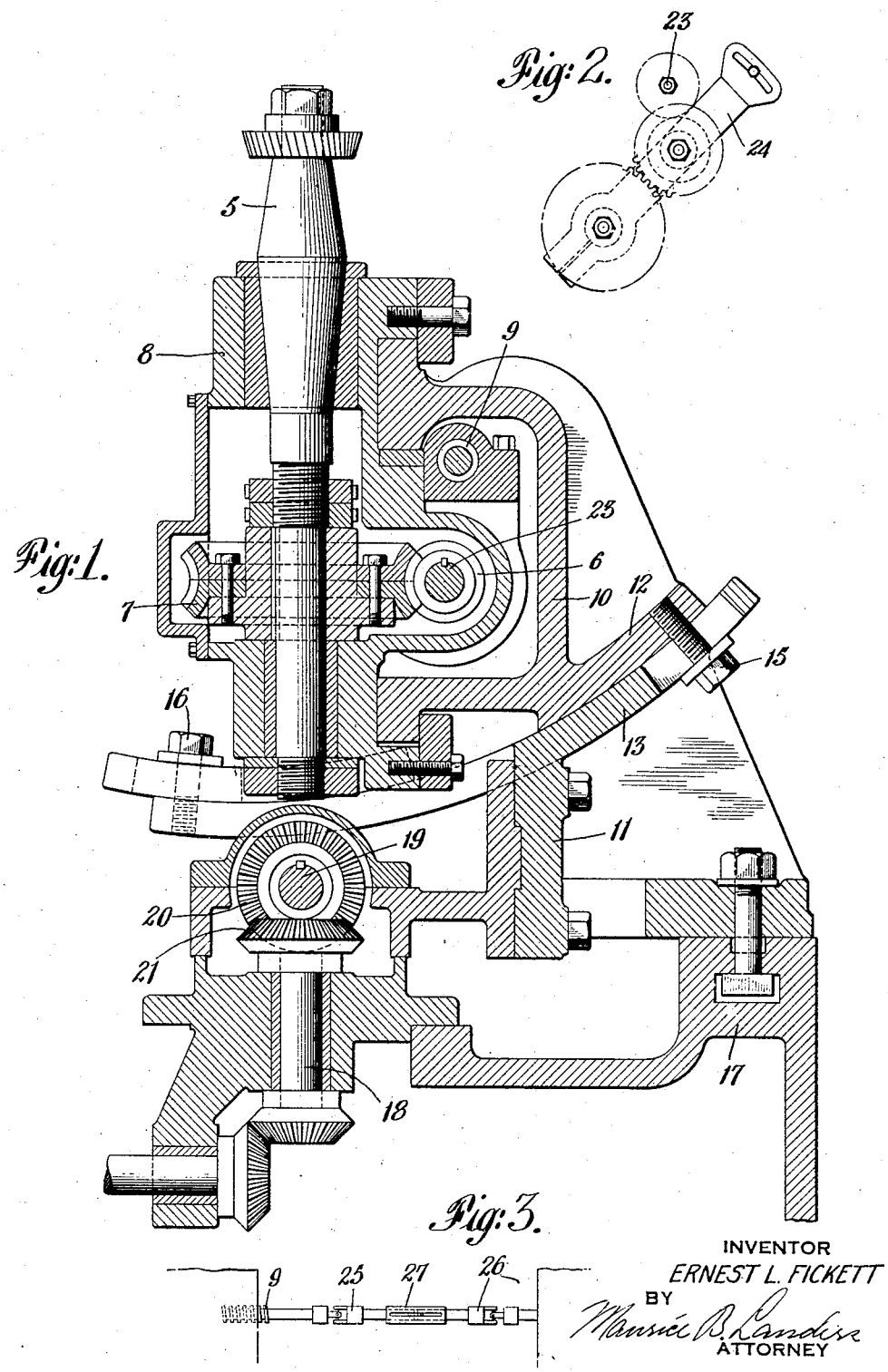
INVENTOR
ERNEST L. FICKETT
BY
Maurice B. Landis
ATTORNEY Patented Mar. 10, 1931                                                  1,796,092

UNITED STATES PATENT OFFICE

ERNEST L. FICKETT, OF FITCHBURG, MASSACHUSETTS, ASSIGNOR, BY MESNE ASSIGNMENTS, TO SCURLOCK GEAR CORPORATION, OF NEW YORK, N. Y., A CORPORATION OF NEW YORK

GEAR-CUTTING MACHINE

Application filed March 1, 1929. Serial No. 343,582.

The present invention has for an object to provide an improved gear cutting machine. The invention has been developed in connection with the design of a machine of the general character of that shown in my prior application S. N. 98,901, filed March 31, 1926, for Letters Patent for machine for producing spiral bevel gears, and for convenience of disclosure such an embodiment will be more particularly described, but it will be understood that the particular description is illustrative merely and is not intended as defining the limits of the invention, the principles of which may be variously applied.

The nature and objects of the invention will be better understood from a description of a particular illustrative embodiment for the purpose of which description reference should be had to the accompanying drawing forming a part hereof and in which—

Figure 1 is a sectional view of the cutter head and carriage of a gear cutting machine embodying the invention, Figure 2 is an end view showing a part of the gearing for driving the cutter spindle, and Figure 3 is a view showing a part of the gearing for driving the cutter head feed screw.

The apparatus shown for the purpose of illustration may be considered as an improvement on the apparatus shown in said prior application and as providing an arrangement whereby the cutter spindle may be adjusted angularly while retaining the general arrangement of gearing for driving said spindle.

Referring to the drawings, the cutter spindle 5 is carried in a carriage moved by a screw in the two-part cutter head which in turn is adjusted on the bed about a vertical axis. The spindle is driven by a worm 6 and worm wheel 7 and the carriage 8 in which the cutter spindle is rotatably mounted is moved longitudinally by a screw 9 to feed the cutter across the face of the work.

In accordance with the present invention the upper part 10 of the cutter head is angularly adjustable on the lower part 11 to permit the cutter to assume different angular positions relative to the work. As shown, the upper and lower parts of the cutter head engage each other on arcuate surfaces formed by flanges 12 and 13. Clamping bolts 15, 16 extending through slots in one flange and threaded into the other flange hold the parts in adjusted position. The arc of the flanges 12 and 13 preferably centers substantially at the cutting point of the cutter on the cutter spindle.

The cutter head as a whole is adjustable angularly on the bed 17 of the machine as in the case of the machine of the previously mentioned application. Power is transmitted to the cutter head through a vertical shaft 18 in the line of the axis about which the head is adjustable. The shaft 19 is driven in all positions of adjustment of the cutter head by bevel gears 20, 21 and the screws 9 and shaft 23 on which the worm 6 is mounted are suitably driven by mechanism which can be maintained operative in all angular positions of the cutter head.

As shown in Fig. 2, the change speed gearing for driving the cutter spindle through the shaft 23 is such that it can be adjusted on the yoke 24 which carries the intermediate gear to accommodate the variation in distance between the two parallel shafts.

Any suitable provision can be made for maintaining the driving connection to the screw 9 for moving the carriage. As shown, the screw shaft 9 is made flexible by the interposition of universal joints 25, 26 and an extensible sleeve 27 to accommodate the relative movement.

It will be understood that variations may be made in the arrangement illustrated without departing from the spirit of the invention as set forth in the following claim.

I claim:

In a gear cutting machine, in combination, a cutter spindle, a carriage in which said spindle is rotatably mounted, a yoke having longitudinal ways in which said carriage is movably mounted, said yoke having an arcuate base, and a support having an arcuate seat in which the yoke is mounted for adjustment angularly in a plane transverse to the direction of movement of the carriage.

In testimony whereof, I have signed my name to this specification this 23rd, day of February, 1929.

ERNEST L. FICKETT.